May 26, 1931.  W. RICHTER  1,806,952
ELECTRODE FOR ELECTRIC WELDING
Filed May 13, 1929
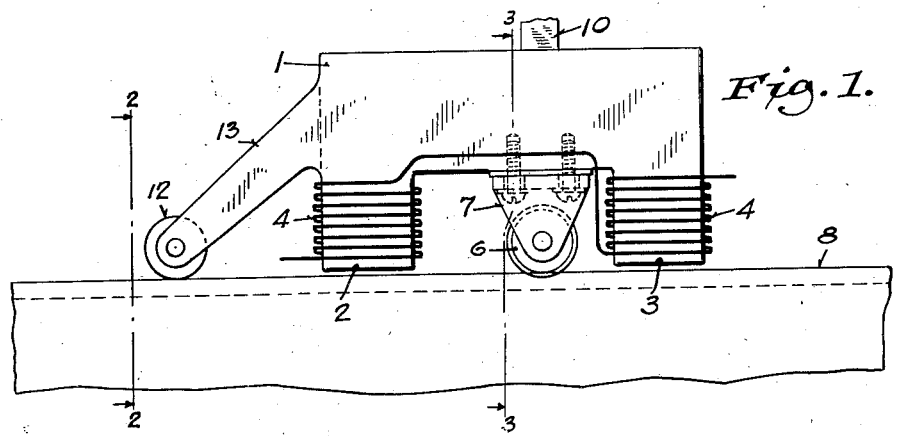
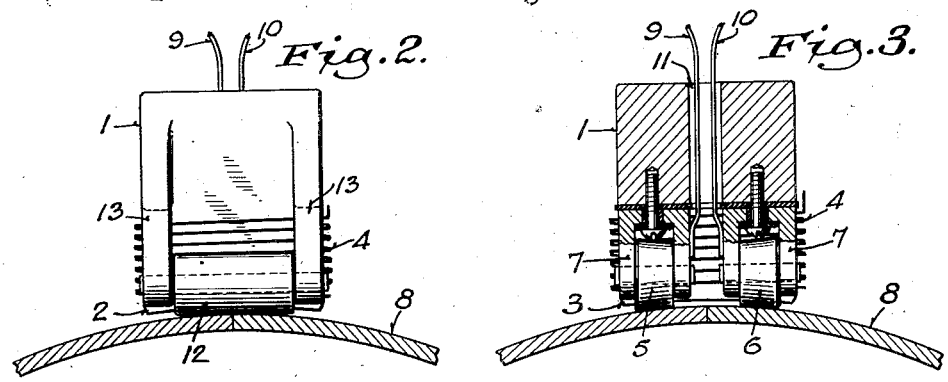
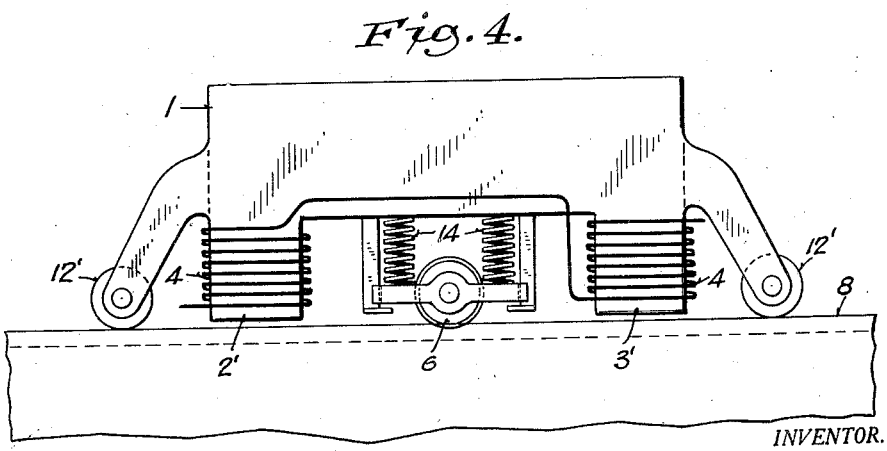
INVENTOR.
WALTHER RICHTER
BY
ATTORNEY.

Patented May 26, 1931

1,806,952

UNITED STATES PATENT OFFICE

WALTHER RICHTER, OF MILWAUKEE, WISCONSIN, ASSIGNOR TO A. O. SMITH CORPORATION, OF MILWAUKEE, WISCONSIN, A CORPORATION OF NEW YORK

ELECTRODE FOR ELECTRIC WELDING

Application filed May 13, 1929. Serial No. 362,712.

This invention relates to an electrode contact apparatus for electric welding and is particularly applicable to electrical resistance welding in which a high pressure contact is required between the electrode and the article to be welded.

One of the obstacles attending previous attempts to manufacture certain articles, such as pipe, by resistance welding, was the inability to impart sufficient rigidity to the wall of the article to withstand the pressure applied thereto by the electrodes. In order to overcome this, it has heretofore been suggested to employ inside mandrels or braces to oppose the electrode pressures. However, when the pipe sections are long and where a plurality of sections are fed successively and progressively to the welding apparatus, it is sometimes difficult and undesirable to brace the pipe on the inside and in such instances the pressure applied by the electrodes to the pipe is limited to the resiliency of the pipe walls.

The invention has for its object the provision of a high pressure electrode contact for progressive welding of tubular articles without the aid of inside mandrels or braces and without the necessity of applying external pressure to said electrodes.

The invention is particularly applicable to welding machines wherein the electrodes and the articles being welded are moved relatively to each other to effect a welding of the seam.

Other objects may become apparent from the following detailed description and illustration of the invention reference being made to the accompanying drawings in which:

Figure 1 is a side elevation illustrating the preferred embodiment of the invention.

Fig. 2 is an end elevation taken on lines 2—2 of Figure 1.

Fig. 3 is a section on line 3—3 of Figure 1.

Fig. 4 is a side elevation of a modified form of the invention.

The apparatus comprises a frame 1 which is preferably made of magnetic material and which has two downwardly extending spaced poles 2 and 3. The poles are provided with coils 4 which may be energized from any suitable source of electricity. Between the poles are arranged a pair of roller electrodes 5 and 6 insulated from and secured to the frame 1 by lugs 7. The electrodes are arranged in alignment and are adapted to contact with the pipe 8 on opposite sides of the edges to be welded. A welding current is supplied to the electrodes from any suitable source by means of conductors 9 and 10 which extend through an opening 11 in the frame.

The poles 2 and 3 are preferably maintained out of contact with the pipe being welded to eliminate friction between the same, and to this end the roller electrodes extend beyond the end portions of the poles. Where the frame cannot be held in a fixed position in a welding machine, it is desirable to locate the electrodes closer to one pole than to the other and to provide a roller 12 suitably secured to the other pole by means of the arms 13, as is clearly shown in Fig. 1.

In the modification shown in Fig. 4 the electrodes 5 and 6 are resiliently mounted and pressed into contact with the pipe by means of springs 14 arranged between the roller electrodes 5 and 6 and the frame 1. The frame is also provided with rollers 12' arranged at each end thereof to insure a proper spacing of the poles 2' and 3' from the pipe.

In the apparatus thus provided, the poles 2 and 3 are magnetized by means of the electric coils 4 and the magnetic attraction resulting therefrom provides sufficient electrode pressures to maintain a proper electrical contact and will also prevent deformation of the side walls resulting from said pressures. The strength of the magnets may be varied to regulate the amount of magnetic attraction between the magnets and the pipe. It is understood that various modifications may be made within the scope of the accompanying claims.

What is desired to be secured by Letters Patent is:

1. In an apparatus for resistance welding longitudinal seams in tubular articles, a U-shaped frame, a pair of aligned roller electrodes insulated from and secured thereto, and magnetic coils surrounding the legs of said U-shaped frame and adapted to be energized to magnetize said legs.

2. In an apparatus for progressive welding tubular articles, a U-shaped frame of magnetic material, a pair of aligned electrodes insulated from and secured to said frame, magnetic coils surrounding the legs of said U-shaped frame, and a roller secured to said frame adjacent one of said legs and extending beyond the end of the leg.

3. In an apparatus for resistance welding longitudinal seams in tubular articles, a U-shaped frame of magnetic material, a pair of aligned roller electrodes insulated from and connected to said frame adjacent one leg thereof, said roller electrodes extending beyond the end of said leg, a roller connected to said frame adjacent the other of said legs and extending beyond the same to maintain said legs out of contact with the tubular member being welded and a magnetic coil surrounding said legs.

4. In a welding apparatus, a roller electrode adapted to engage the article to be welded and to move progressively therealong, and magnetic means adjacent said electrode to maintain the same in desired electrical contact with the article.

5. In an apparatus for resistance welding longitudinal seams in tubular articles, a pair of roller electrodes adapted to rotatably engage the adjacent edges of the tubular article, and magnetic means adjacent said electrodes for maintaining the desired contact between the electrodes and the tubular article.

6. In an apparatus for progressive electric resistance welding, a roller electrode, means for supporting and guiding said electrode along the work to be welded, and an electromagnetic member on said supporting means for applying the desired electrode pressure to the work.

In witness whereof, I have hereunto signed my name at Milwaukee, Wisconsin, this 7th day of May, 1929.

WALTHER RICHTER.